United States Patent [19]
Bland et al.

[11] Patent Number: 5,619,729
[45] Date of Patent: Apr. 8, 1997

[54] POWER MANAGEMENT OF DMA SLAVES WITH DMA TRAPS

[75] Inventors: Patrick M. Bland, Delray Beach; Richard G. Hofmann, Lake Worth; Robert T. Jackson, Boynton Beach; Nader Amini, Boca Raton, all of Fla.; Bechara F. Boury, Milpitas; Jayesh Joshi, Santa Clara, both of Calif.

[73] Assignees: Intel Corporation, Santa Clara, Calif.; International Business Machines Corporation, Armonk, N.Y.

[21] Appl. No.: 584,805

[22] Filed: Jan. 11, 1996

Related U.S. Application Data

[63] Continuation of Ser. No. 162,488, Dec. 2, 1993, abandoned.

[51] Int. Cl.⁶ ................................................. G06F 13/00
[52] U.S. Cl. ...................... 395/848; 395/750; 395/735
[58] Field of Search ................................. 395/750, 735, 395/838, 839, 843, 848

[56] References Cited

U.S. PATENT DOCUMENTS

| | | | |
|---|---|---|---|
| 4,528,626 | 7/1985 | Dean et al. | 395/848 |
| 4,716,523 | 12/1987 | Burrus, Jr. et al. | 395/848 |
| 5,041,964 | 8/1991 | Cole et al. | 395/750 |
| 5,185,877 | 2/1993 | Bissett et al. | 395/842 |
| 5,313,642 | 5/1994 | Seigel | 395/750 |
| 5,408,668 | 4/1995 | Tornai | 395/750 |

*Primary Examiner*—Glenn A. Auve
*Attorney, Agent, or Firm*—Blakely, Sokoloff, Taylor & Zafman

[57] ABSTRACT

A device and method for power management of direct memory access ("DMA") slaves through DMA traps. The device comprises a plurality of registers coupled with conventional logic in order to generate a control signal for disabling direct memory access transfer requests for a powered-off DMA slave until the slave is re-powered. The method for managing power comprises steps of unmasking bits in a register containing information regarding which DMA slaves have been powered-off. Next, the DMA Controller consults a power management macro ("PMM") to determine whether a DMA transfer request involves a powered-off DMA slave. If not, the DMA transfer continues. However, if the DMA transfer does involve a powered-off DMA slave, then a main software application in operation is temporarily halted and the PMM generates a SMI signal and outputs the SMI signal to the central processing unit ("CPU") while keeping the disable control signal asserted, which effectively disables the DMA channel. The SMI signal invokes a software service routine which re-powers the powered-off DMA slave so that the main software application can continue.

34 Claims, 5 Drawing Sheets

POWER MANAGEMENT OF DMA SLAVES WITH DMA TRAPS

This is a continuation application of Application No. 08/162,488, filed Dec. 2, 1993, now abandoned.

BACKGROUND OF THE INVENTION

1. Field of the Invention

The present invention relates to a power management architecture scheme in a computer system. More specifically, the present invention relates to power management of DMA slaves through DMA traps.

2. Art Background

It is a becoming a necessity for many companies to use portable and laptop computers. Due to an increased demand for portable and laptop computers, their respective markets are becoming quite profitable and highly competitive. In order for the computer industry to provide a more affordable portable and laptop computer, there exists a crucial need for efficient power management architecture schemes in view of the fact that these computers are generally supplied by limited power sources such as batteries. Thus, power should be conserved wherever possible for reliability and economic reasons.

It is commonly known that most portable and laptop computer systems are based on Industry Standard Architecture ("ISA"), which is basically an IBM PC architecture employing a multi-master bus system which can support several bus slaves, but can only be controlled by one bus master at a time. A bus master is a device which controls a system bus, and initiates bus cycles. A bus slave, such as any input/output ("I/O") device, only receives bus cycles without having a capability of initiating them.

Conventional power management schemes are generally accomplished by monitoring and controlling power to certain I/O devices, such as a keyboard, a floppy disk drive and a hard disk drive. The I/O devices were generally monitored in lieu of memory devices since I/O devices usually require more power to operate. For example, when a software application is being executed by the CPU, there exist many I/O devices which are unnecessarily running and thereby wasting power. To eliminate such waste, the computer industry has devised conventional computer systems which could "power-off" the unnecessary I/O devices. However, there existed one major flaw with such conventional computer systems; specifically, if the CPU attempted to read data from or write data into any one of a "powered-off" I/O device, the software application would fail unnecessarily. Such unnecessary failures greatly increases the run-time of the software application and, thus, decreases its performance capabilities.

In response to these software application failures, Intel® Corporation of Santa Clara, Calif. developed the 386™SL superset 1 which is the first superset to employ a power management architecture scheme designed to manage power use within the computer system. Such scheme was based on the operation of a Power Management Macro ("PMM") 6. As shown in FIG. 1, the SL superset 1 utilizes a system bus 2, which commonly an 8-bit bus, coupled to a plurality of bus masters, such as a CPU 3 and a DMA Controller 4. The system bus 2 is further coupled to a plurality of bus slaves 5a–5n, (e.g., I/O devices) and the PMM 6.

The PMM 6 is a programmable power manager comprising a plurality of storage elements, such as registers, used to maintain a list of bus slaves 5a–5n which are powered-on or powered-off; a list of physical addresses of such bus slaves; and a circuit to monitor the system bus 2 for access requests directed toward the bus slaves 5a–5n. The PMM 6 is programmed in accordance with the number of bus slaves 5a–5n coupled to the system bus 2. The operation of the conventional power management system within the SL superset 1 is illustrated in FIG. 2 as follows.

The CPU 3 places an access request on the system bus 2 to request access to a specific bus slave. For illustration purposes, let us presume that an I/O cycle is directed toward the bus slave 5a. The PMM 6 monitors the I/O cycle and determines whether the bus slave 5a is "powered off". If so, the PMM 6 signals the CPU 3 to halt execution of a main software application and to enter into a System Management Mode ("SMM"). SMM is a mode which allows the CPU 3 to operate within a special environment completely isolated from the main software application. This SMM mode is enabled when the PMM 6 generates a System Management Interrupt ("SMI") to the CPU 3 by activating a SMI control signal line 7 as shown in FIG. 1. This, in turn, would prompt a software service routine stored in memory to service the SMI. After the software service routine has serviced the SMI (i.e., the device is "powered-on"), the SMM would be exited thereby allowing the main software application to continue. All these operations being transparent to the user and the main software application.

However, one problem associated with the conventional power management system is that there exists no equivalent "SMI" mechanism to interrupt an alternative bus master, such as the DMA Controller 4, when it controls the system bus 2. Instead, as shown in FIG. 1, the conventional SL superset 1 utilized simple bus monitoring through I/O programmable traps to manage power status of the bus slaves 5a–5n when the DMA Controller 4 is in control of the system bus 2. More particularly, DMA was controlled by implementing a register 8 within the DMA Controller 4 so that DMA transfers could be requested by writing to this register 8. The PMM 6 would continuously monitor the register 8 so that once the DMA request was detected, all of the bus slaves susceptible to DMA transfer (i.e., DMA slaves) 5a–5n would be re-powered to allow the DMA to occur. Re-powering every DMA slave 5a–5n, however, does not efficiently optimize power usage. Hence, it would be desirable to implement a power management system capable of re-powering only a selected DMA slave which is accessed by the DMA Controller 4 in order to minimize power consumption.

Another problem is that even if the computer system was designed so that the PMM 6 could manage the DMA Controller 4 through interrupts such as SMI, the PMM 6 would still not be able to detect the beginning of a I/O cycle until after it had already begun. Since the PMM 6 is monitoring the system bus 2, the I/O cycle would be detected after external memory 9 had been accessed. Accordingly, it would be a great advantage and is therefore an object of the present invention to provide earlier power management of the DMA slaves transparent to the main software application.

SUMMARY OF THE INVENTION

The present invention describes an apparatus and method for efficiently managing power allocation throughout a computer system. More particularly, a device and method for power management of DMA slaves through DMA traps.

The device comprising a plurality of registers coupled with conventional logic in order to generate a control signal for disabling each DMA channel wherein each channel corresponds to a distinct slave device. The disable control signal keeps a DMA channel disabled until the slave device on that channel is re-powered. Alternatively, the control signal could foreseeably operate to enable a DMA channel.

The method for managing power comprises steps of unmasking bits in a DMA Trap Enable register which illustrates what channels are associated with powered-off slave devices. Next, the DMA controller consults the PMM whenever DMA is requested by inputting a strobe signal into the PMM and also inputting the corresponding channel number. Then, the PMM responds by asserting or deasserting the disable control signal provided the device on that channel is off or on respectively. If the device is powered on, DMA proceeds normally. However, if the device is powered off, the PMM generates an SMI signal and outputs the SMI signal to the CPU while keeping the disable control signal asserted, which effectively disables the DMA channel. The SMI signal invokes a software service routine which re-powers the powered-off slave devices, and clears the disable signal so as to re-enable the DMA channel. When a device is detected to be idle by conventional logic or system software, it is powered off, and its corresponding bit is set in the DMA Trap Enable register and the method continues.

BRIEF DESCRIPTION OF THE DRAWINGS

The objects, features and advantages of the present invention will become apparent from the following detailed description of the present invention in which.

DETAILED DESCRIPTION OF THE INVENTION

An apparatus and method are described for efficient power management of DMA slaves being accessed by the DMA Controller through DMA traps. In the following detailed description, numerous specific details are set forth, such as specific bit width of DMA trap support registers contained in the PMM, including a DMA Channel Trap Enable register (a "DMA_CH_TRP_EN" register) 22. Such details are used to provide a thorough understanding of the present invention. However, it is apparent to one skilled in the art that the invention may be practiced without these details. In other instances, well-known elements, devices, process steps and the like are not set forth in detail to avoid unnecessarily obscuring the present invention. Although the present disclosure discusses trapping I/O cycles since I/O devices generally use more power, it is also contemplated that the present invention can be designed to trap memory bus cycles as well as any other bus cycles.

Figure 3:
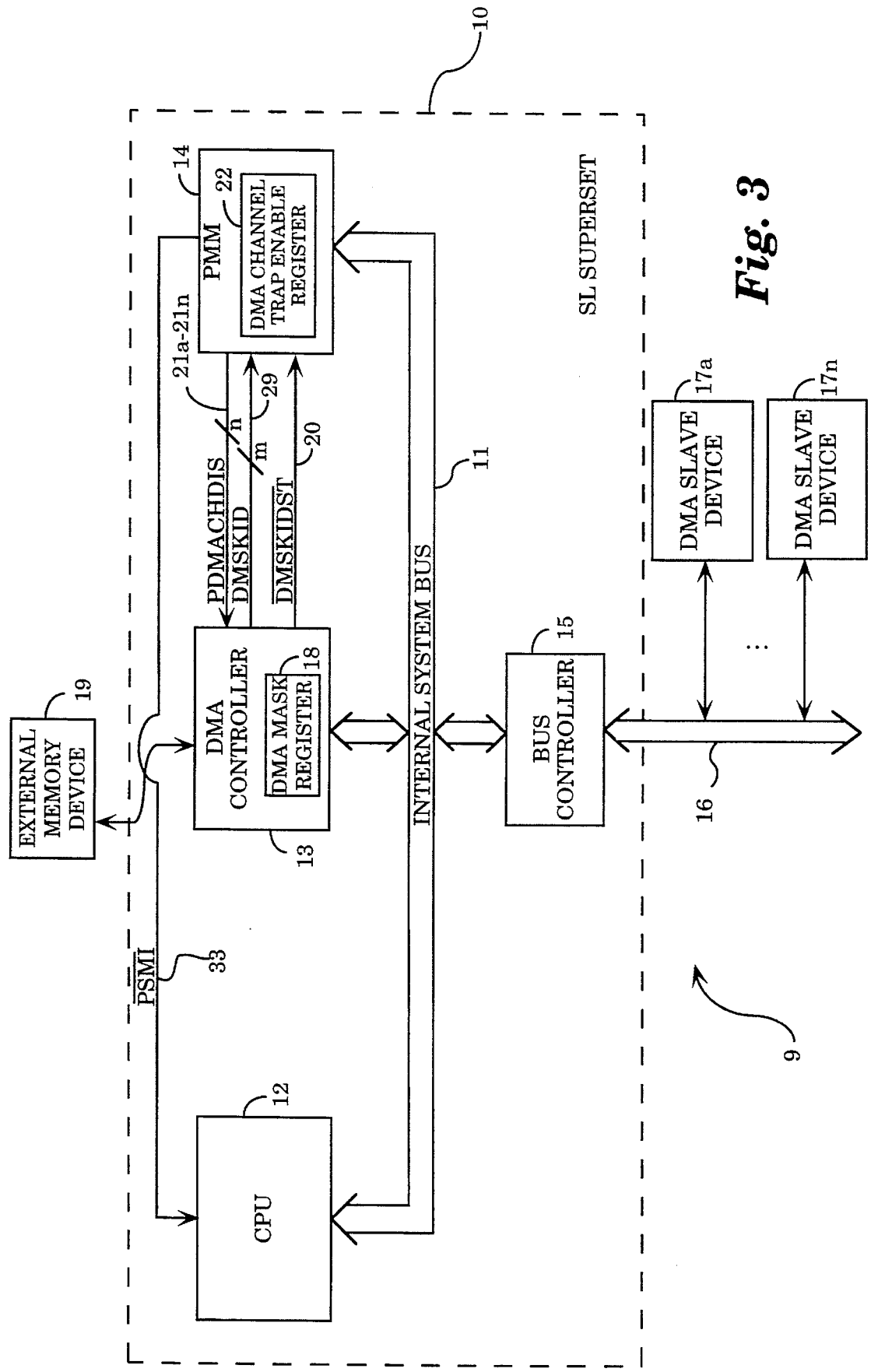
FIG. 3 is a block diagram of the present invention which enables DMA traps to be detected through handshaking signal lines between the DMA controller and the Power Management Macro.

Referring now to FIG. 3, it illustrates one embodiment of the present invention implemented within a computer system 9 where conventional logic elements in combination with system software are used to detect DMA traps used for power management. The embodiment illustrates a chip superset 10 comprising an internal system bus 11 enabling data communication between a CPU 12, a DMA Controller 13, a PMM 14 and at least one bus slaves, such as, for example, a bus controller 15. The bus controller 15 is coupled to an external system bus 16 to enable communication between the chip superset 10 and a plurality of DMA slave devices 17a–17n, where "n" is an arbitrary whole number. Although the present description discusses the application of the DMA in the chip superset 10, it is contemplated that the present invention may be employed to operate in connection with a single global system bus providing communication between the CPU 12, the DMA Controller 13 and the PMM 14.

Figure 1:
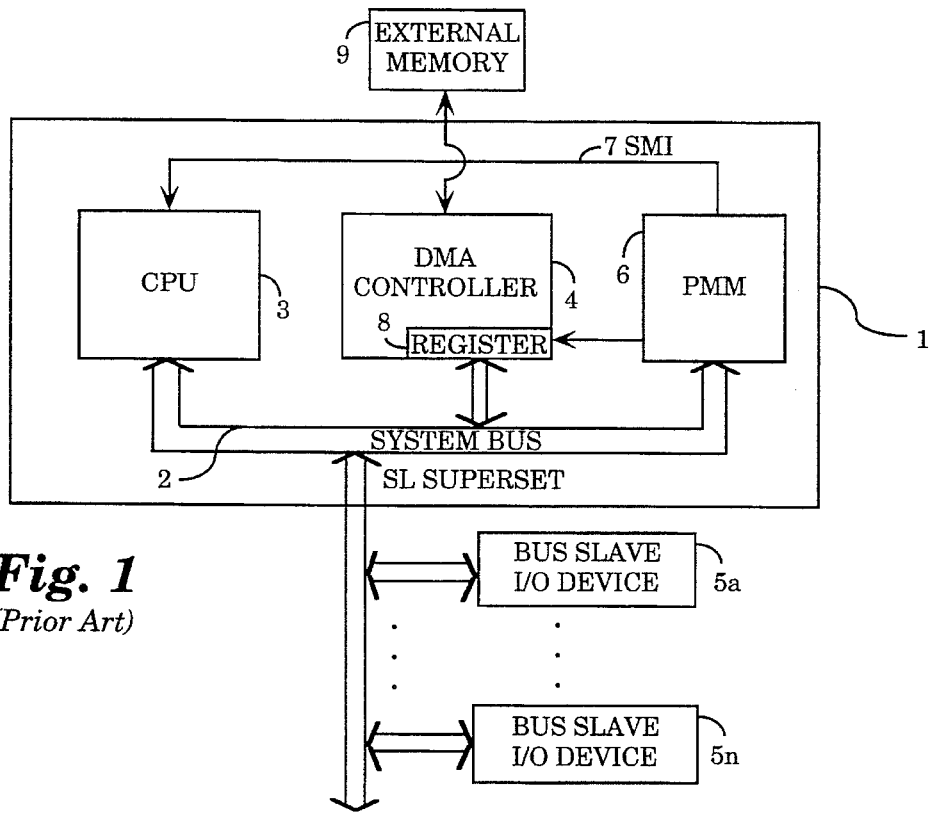
FIG. 1 is a block diagram of a conventional DMA slave power management scheme.
Figure 2:
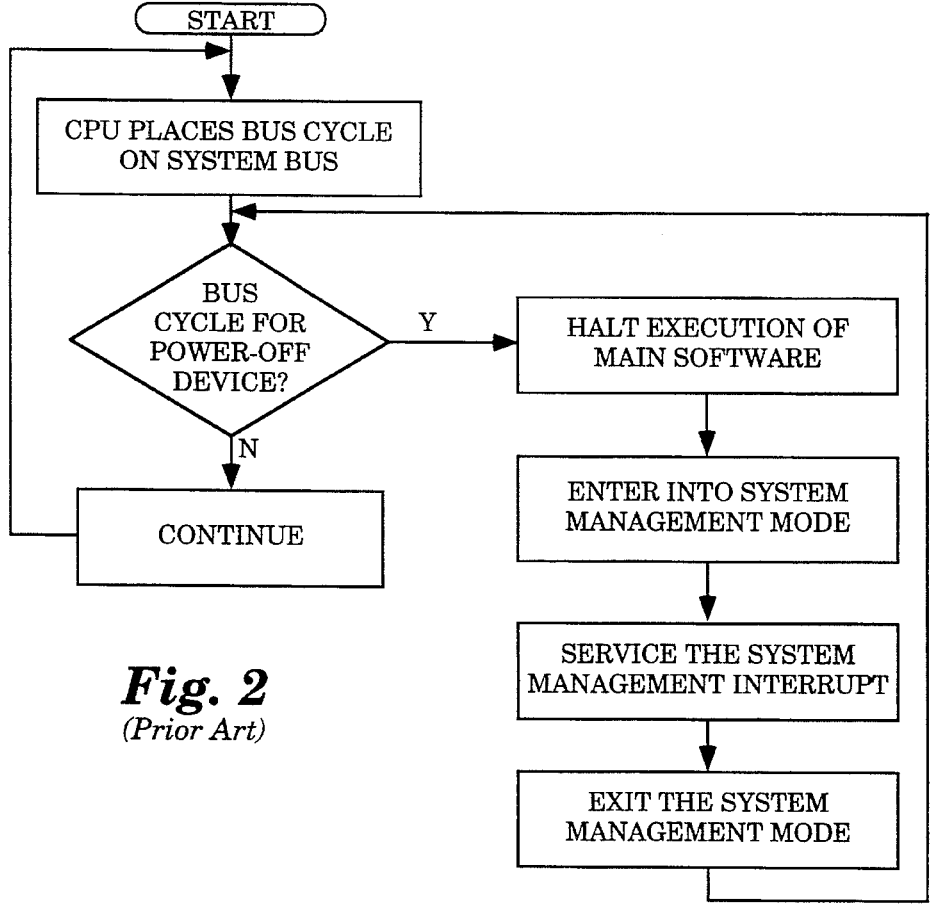
FIG. 2 is a flowchart of the operation of the conventional DMA slave power management scheme.

The DMA Controller 13 is programmable to support system control blocks ("SCBs") which are instructions in memory for storing pertinent information concerning the plurality of DMA slave devices 17a–17n, contrary to the conventional DMA Controller 4 illustrated in FIG. 1. Each SCB is identified according to a specific channel number so that when the CPU 12 writes to the DMA Controller 13 via the internal system bus 11 to perform a DMA with respect to channel "n", the DMA Controller 13 is able to ascertain the nature of the "nth" DMA slave device (e.g., whether it can do multiple transfers), its physical address and so on. In general, software maintains a list of channels which correspond to powered-off devices.

The arbitration status of these channels is stored in a DMA Mask Register 18. The DMA Mask Register 18 is an eight-bit register, but it is contemplated that the DMA Mask Register 18 could be any bit width corresponding to the number of DMA channels within the computer system subject to DMA transfers.

The PMM 14, on the other hand, is coupled to the system bus 11 to monitor the I/O cycles placed thereon. However, such coupling, by itself, does not enable the PMM 14 to detect the I/O cycle at its starting point, i.e., when the DMA Controller 13 first accesses at least one external memory device 19. As a result, the DMA Controller 13 and the PMM 14 are further coupled together via a plurality of handshaking signal lines 20, 21 and 29 to ensure that a System Management Interrupt ("SMI") is generated and sent to the CPU 12 before a current I/O mask clear cycle ends. The SMI is operated by activating a system management interrupt signal line ("$\overline{PSMI}$") 33 coupling the CPU 12 and PMM 14. The number of "n" handshaking signals 21 and 29 is a function of the number of DMA channels.

As a result, instead of performing DMA immediately after a CPU request, the DMA Controller 13 and the PMM 14 operate in combination to initially verify whether the I/O device corresponding to the specific channel designation is powered-on or powered-off. If the latter, the PMM 14 keeps the specific DMA channel masked for a predetermined time period to allow the I/O device to be powered-on.

In the embodiment shown in FIG. 3, the plurality of handshaking signal lines include at least one active low DMA Mask ID Strobe ("$\overline{DMSKIDST}$") signal line 20 which is used to signal the PMM 14 that the CPU 12 has requested DMA between the external memory device 19 and a selected DMA slave device, such as a printer 17a, whose channel is placed on the internal system bus 11. The plurality of handshaking signal lines further include at least one DMA Mask ID ("DMSKID") signal line 29, which provides a binary representation of the channel number of the selected DMA slave device and a plurality of DMA Channel Disable ("PDMACHDIS") control signal lines 21a–21n which are used to temporarily disable DMA if the selected DMA slave is "powered-off".

Figure 4:
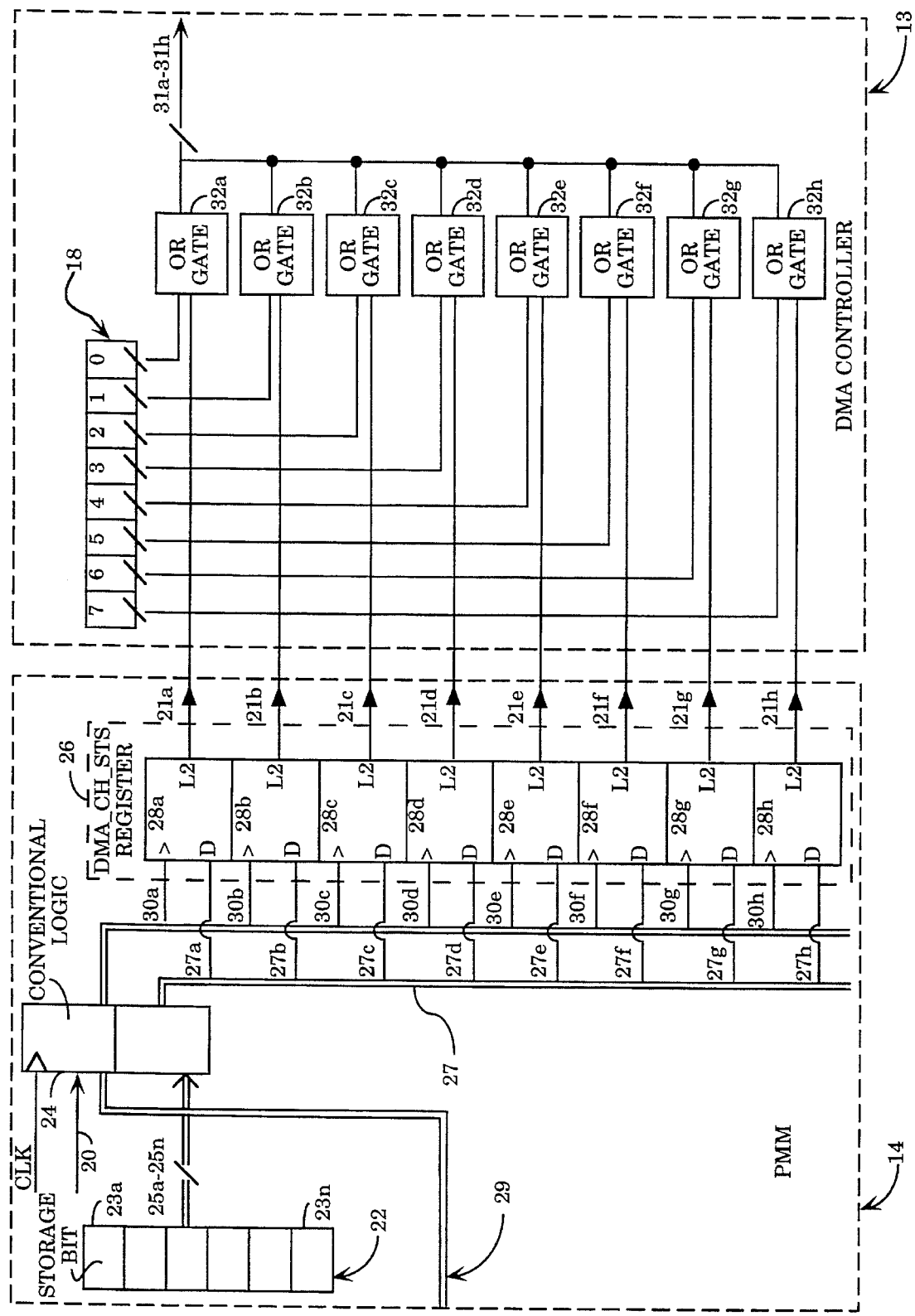
FIG. 4 is a detailed illustration of one embodiment of the logic elements within the DMA Controller and the PMM to support the handshaking.

Referring now to FIG. 4, it provides a more detailed illustration of the internal logic of the DMA Controller 13 and the PMM 14 of the present invention to support the $\overline{\text{DMSKIDST}}$ and the PDMACHDIS control signal lines 20 and 21a–21n.

As briefly discussed above, the PMM 14 comprises several storage elements, such as registers, which operate in combination with conventional logic so as to disable DMA for the particular channel when the channel representing a "powered-off" bus slave is unmasked. One of these storage elements is the DMA_CH_TRP_EN register 22 having a plurality of storage bits 23a–23n, wherein each bit 23a–23n represents the power status of a corresponding DMA slave device; namely, the storage bit is "high" or "low" to signify whether the corresponding DMA slave device is "powered-off" or "powered on" respectively. The plurality of storage bits 23a–23n in the DMA_CH_TRP_EN register 22 are separately coupled to conventional logic 24 through a corresponding plurality of channel status control signal lines 25a–25n.

The DMA_CH_TRP_EN register 22 has a two-fold purpose; namely, it generates the SMI signal when a mask bit in a DMA Mask register 18 is cleared and it also sets a corresponding bit in a DMA Channel Status register (the "DMA_CH_STS register") 26, thus disabling DMA on that channel. Therefore, when a bit in the DMA_CH_STS register 26 is set, it shows that the SMI has occurred for that DMA channel, thereby disabling that channel. If a bit in the DMA_CH_STS register 26 is not set, the DMA is enabled for that channel.

Upon receipt of an active low DMA Mask ID strobe signal ("$\overline{\text{DMSKDST}}$") 20, the conventional logic 24, clocked by a system clock ("CLK"), drives the values contained in the storage bits 23a–23n into the DMA_CH_STS register 26 through a corresponding plurality of DMA Channel Disable input signal lines 27a–27n. The DMA_CH_STS register 26 comprises a plurality of storage elements 28a–28n, which are typically, but not limited to, D-type flip flops.

In the embodiment shown in FIG. 4, the DMA_CH_STS register 26 is arbitrarily chosen to comprise eight D-type flip-flops in order to effectively monitor eight or less DMA devices. However, it is obvious that a person skilled in the art could implement a register having a greater or lesser number of storage elements. As a result of the selected configuration of the DMA_CH_STS register 26, there are eight DMA Channel Disable input signal lines 27a–27h, each of which are individually coupled to the corresponding D-type flip flops 28a–28h at their respective D-input. Therefore, the D-type flip flops 28a–28h will generate a signal identical to its respective DMA Channel Disable input signal 27a–27h upon an active clock input.

The clock inputs of the D-type flip flops 28a–28h are based on a decoded value of the at least one DMSKID signal line 29. Then, at least one DMSKID signal line 29 is coupled to conventional logic 24 and thereafter decoded so as to activate only one of a plurality of DMA Channel Clock Disable input signal lines 30a–30h, where in this embodiment, the DMSKID signal line 29 directly activates one of eight DMA Channel Clock Disable input signal lines 30a–30h. Activating one DMA Channel Clock Disable input lines 30a–30h, in turn, activates a corresponding PDMACHDIS signal line 21a–21h. Moreover, the at least one DMSKID signal lines 29 is, in fact, three signal lines ("m"=3) that would act as a binary representation of the eight channels which can be identified by the DMA Controller 13. Therefore, based on the binary representation on the DMSKID signal lines 29, one of the eight clocking DMA Channel Clock Disable input signal lines 30a–30h is activated to allow the corresponding D-type flip flop to generate a corresponding plurality of PDMACHDIS signal lines 21a–21h.

In this embodiment, the DMA Mask Register 18 is an eight-bit register, but it is contemplated that the DMA Mask Register 18 could be any bit width depending on the number of DMA bus slaves in the computer system. Each bit of the DMA Mask Register 18 is coupled to one input of a corresponding two-input gating elements 32a–32h, such as, for example an OR gate. The plurality of PDMACHDIS signal lines 21a–21h are coupled to a second input of the gating elements 32a–32h respectively. Therefore activating the PDMACHDIS signal lines 21a–21h in combination with clearing a specific bit the DMA Mask Register 18 will, in effect, activate the output signal lines 31a–31h so as to temporarily disable DMA or arbitration requests on the specific channel.

Figure 5:
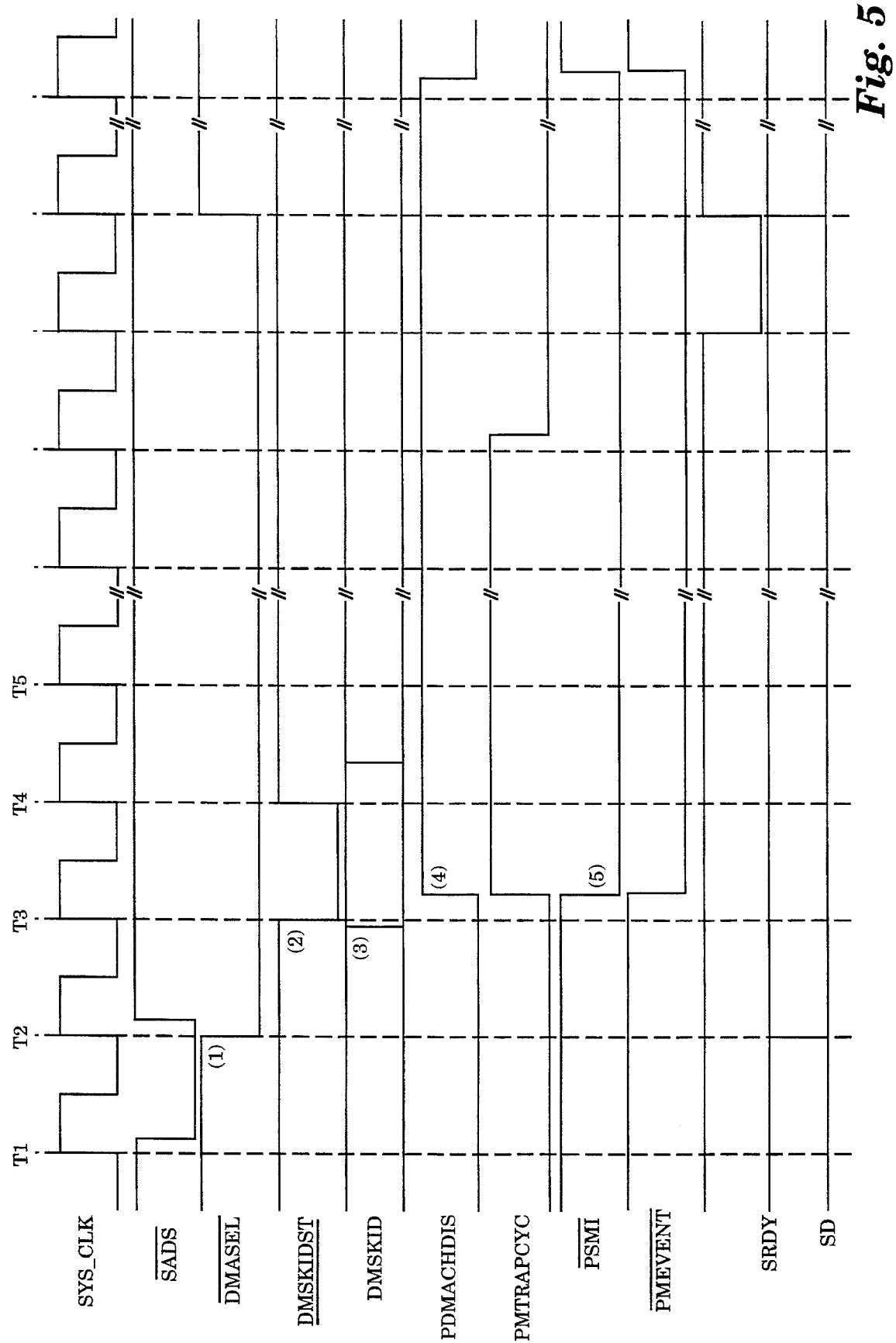
FIG. 5 is a timing diagram of the operations of the present invention.

The following is a detailed description of the operations of the power management architecture scheme pursuant to a particular embodiment in FIG. 4. As shown in the timing diagram in FIG. 5, the CPU first requests the DMA Controller 13 to commence DMA on a selected channel by clearing a corresponding bit in the DMA Mask register 18. This is accomplished by the CPU placing a DMA address on the internal system bus 11 and then sending a strobe ("$\overline{\text{SADS}}$") to indicate that the DMA address is valid.

As stated above, instead of performing DMA immediately after the CPU 12 first unmasks the selected channel bit in the DMA Mask Register 18 and the DMA_TRP_EN register 22, the DMA Controller 13 and the PMM 14 use handshaking signals in order to verify whether the selected channel is disabled (i.e., powered-off), and if so, masked the selected channel for a predetermined time period to allow the corresponding DMA slave device to be powered-on. Such handshaking occurs as follows.

After the DMA Controller 13 recognizes that the DMA cycle is directed toward a DMA via I/O address and control signals as discussed above, the DMA Controller 13 asserts a $\overline{\text{DMASEL}}$ signal line. The DMA Controller 13 then generates the $\overline{\text{DMSKIDST}}$ signal (Step 2) and places the binary representation of the channel number on the DMSKID signal lines 29 to indicate which channel requires DMA (Step 3). If the specific channel is powered-on, the DMA transfer occurs. However, if the specific channel is powered-off, the corresponding PDMACHDIS signal is activated to disable any subsequent DMA transfers (Step 4). Concurrently, a PMTRAPCYC signal is generated by the PMM, indicating that the PMM has trapped this current I/O cycle, and a SMI request is generated by the PMM 14 through activation of the PSMI signal line (Step 5). The PMTRAPCYC signal goes to all the internal system bus slaves, which, in this case, is the DMA Controller 13, and commands to the internal system bus slave not to terminate a cycle as long as it is asserted. The PMM 14 will release PMTRAPCYC only after the CPU 12 identifies the SMI. The DMA Controller 13 then activates a ready signal ("SRDY") (Step 6). The interrupt service routine then goes off and re-powers the device on the specific channel and re-initializes it. Thereafter, the PMM 14 clears the SMI request and enables the DMA channel by deasserting the PDMACHDIS signal. Therefore, the PDMACHDIS signal serves a dual function for disabling and enabling a DMA channel.

Figure 6:
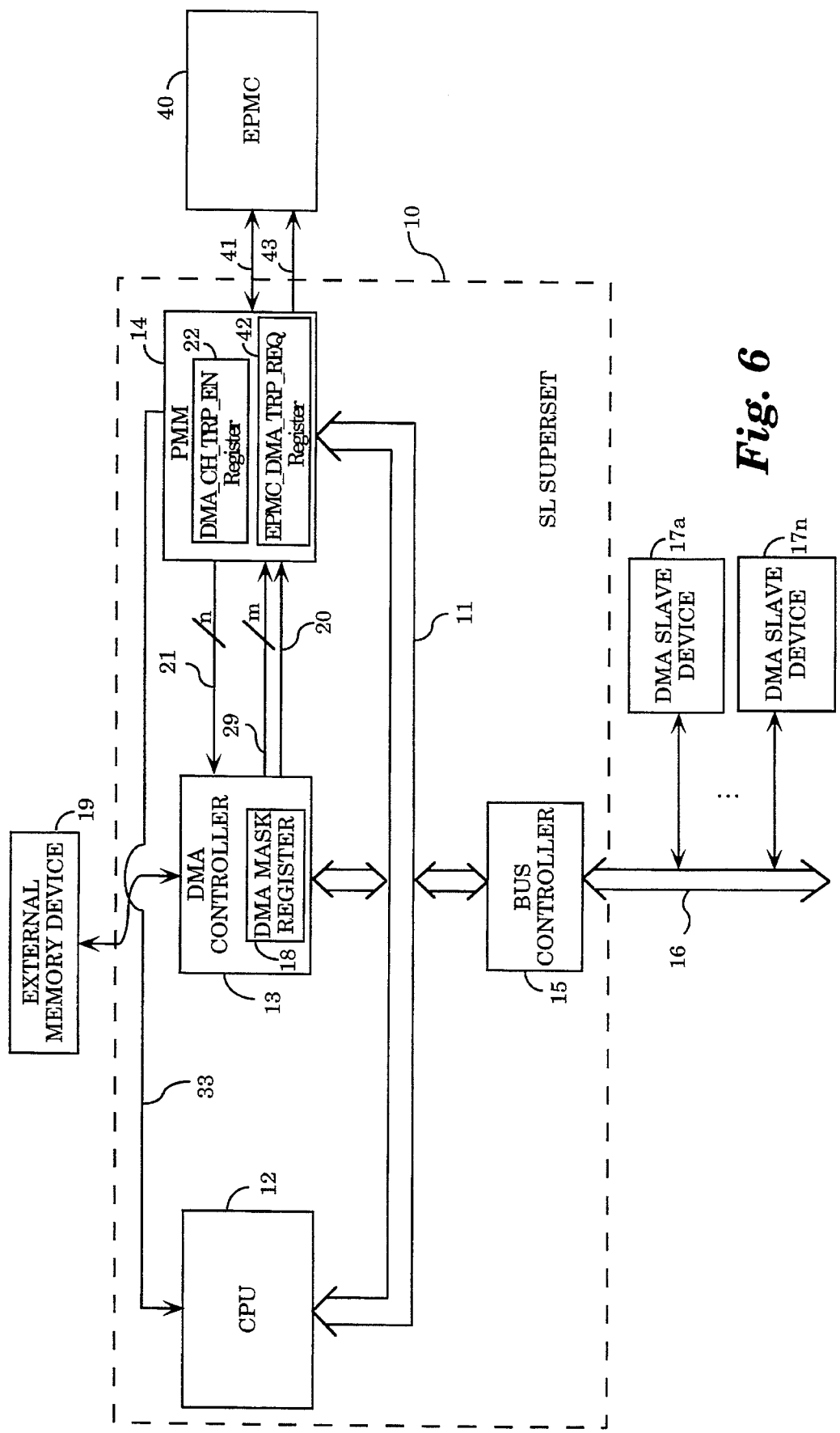
FIG. 6 is a block diagram of the present invention as shown in FIG. 5 but including an external power management controller.

Another embodiment of the present invention relates to FIG. 6, wherein an External Power Management Controller ("EPMC") 40 may be coupled to the PMM 14 through a dedicated 8-bit bus 41 in order to provide some of the power management functions supplied by the CPU 12. The main reason for utilizing the EPMC 40 is to enhance system performance by freeing the CPU 12 from being required to perform certain power management functions. For example, the EMPC 40 could be designed to operate some software applications based upon an interrupt to the EPMC 40. Another reason for such an embodiment is to utilize other pins of the EMPC 40 to control switches to power-off or power-on a specified I/O device, instead of the chip superset 10.

The PMM includes at least one EPMC DMA Trap Request register (the "EPMC_DMA_TRP_REQ" register) 42 which contains the status bits 43 pertaining to the DMA channels. If a status bit is set, it indicates that a DMA trap on that channel has generated a Power Management Event ("PMEVENT") signal 43. The $\overline{\text{PMEVENT}}$ signal 43 is an interrupt to the EPMC 40. It invokes the EPMC's power management software for servicing any event in the system that might require the EPMC's attention. A shown in FIG. 5, the $\overline{\text{PMEVENT}}$ signal would be activated concurrently with the $\overline{\text{PSMI}}$ signal. However, the status bits only provide information about the DMA channel status to the EPMC 40. Actual enabling and/or disabling of DMA channels is done by the status bits in the DMA_CH_STS register 26.

A further embodiment is to incorporate a Power Management Control Register (not shown) within the PMM 14 in order to provide the computer system with a way to disable the PMM 14 from performing certain DMA traps. The Power Management Control Register would thus include a Power Management Enable/Disable bit. When the Enable/Disable bit is set, the PMM 14 is allowed to extend its bus cycles by asserting the PMTRAPCYC signal to all the system bus slaves. When this bit is reset, PMTRAPCYC is not asserted.

The present invention described herein may be designed in many different methods and using many different components. While the present invention has been described in terms of various embodiments, other embodiments may come to mind to those skilled in the art without departing from the spirit and scope of the present invention. The invention should, therefore, be measured in terms of the claims which follow.

What we claim is:

1. An apparatus managing power usage of at least one device capable of performing direct memory accesses, the apparatus comprising:

means for controlling a direct memory access by a selected direct memory access device of said at least one device;

means for managing power status of said at least one device; and means for coupling said controlling means to said power managing means, said coupling means includes a plurality of handshaking signal lines including at least one direct memory access mask identification signal line transferring a signal from said controlling means into said power managing means to indicate that the direct memory access is to be performed by said selected direct memory access device.

2. The apparatus according to claim 1, wherein a channel number, corresponding to said selected direct memory access device, is transferred from said means for controlling to said means for managing.

3. The apparatus according to claim 2, wherein the channel number corresponding to the selected direct memory access device propagates through the at least one direct memory access mask identification signal line in a binary representation.

4. The apparatus according to claim 1, wherein said plurality of handshaking signal lines further transfers an address strobe from said controlling means to said power managing means to indicate that the direct memory access has been requested between the selected direct memory access device and an external memory unit.

5. The apparatus according to claim 1, wherein said plurality of handshaking signal lines further includes at least one channel disable signal line, wherein the at least one channel disable signal line is activated if the power managing means determines that the selected direct memory access device is inoperative.

6. The apparatus according to claim 5, wherein the direct memory access is delayed if the at least one disable signal line is activated.

7. The apparatus according to claim 1, wherein said controlling means including a direct memory access controller.

8. The apparatus according to claim 7, wherein the power managing means includes a first storage element for storing power status information for said at least one device.

9. The apparatus according to claim 8, wherein said first storage element includes a register.

10. The apparatus according to claim 8, wherein the power managing means further includes a second storage element coupled to said first storage element via at least one control signal line, said second storage element is also coupled to said controlling means through said at least one direct memory access mask identification signal line.

11. The apparatus according to claim 10, wherein the second storage element includes at least one D-type register.

12. An apparatus managing power usage of at least one device capable of performing direct memory accesses, said apparatus comprising:

a direct memory access controller; and a power management device coupled to said direct memory access controller via a plurality of signal lines, said power management device prevents the direct memory access controller from supporting the direct memory access between the at least one device and an external memory unit, wherein said plurality of signal lines includes at least one mask identification signal line that transmits a channel number of a selected device of said at least one device chosen to perform the direct memory access, and at least one channel disable signal line that is activated when the selected device is inoperative.

13. The apparatus according to claim 12, wherein the power management device includes a first storage element to store power status information pertaining to said at least one device.

14. The apparatus according to claim 13, wherein the power management device further includes a second storage element coupled to said first storage element via a plurality of control input signal lines and said direct memory access controller via said plurality of signal lines.

15. A computer system managing power usage of at least one device capable of performing direct memory accesses, said computer system comprising:

bus means for transferring data;

means for controlling an access to said bus means;

means for processing data within said computer system, said processing means being coupled to said bus means;

storing means for storing data;

control means for controlling a direct memory access between said storing means and said at least one device, said control means generating a plurality of direct memory access control signals through at least one direct memory access control signal line; and power means for managing power status of said at least one device by generating a plurality of power management control signals to be inputted into said control means, said plurality of power management control signals including at least one signal for temporarily disabling the direct memory access.

16. The computer system according to claim 15, wherein the plurality of direct memory access control signals include at least one direct memory access mask identification signal being a channel number identifying a selected direct memory access device of said at least one device chosen to perform direct memory access.

17. The computer system according to claim 16, wherein the at least one direct memory access mask identification signal is transmitted to the power means through a plurality of data bit lines as a binary representation of the channel number.

18. The computer system according to claim 17, wherein the plurality of direct memory access control signals includes an address strobe outputted from said control means, said address strobe indicating that direct memory access has been requested between the selected direct memory access device and said storing means.

19. The computer system according to claim 18, wherein the at least one signal for temporarily disabling direct memory access is transmitted from the power means and into the control means through at least one channel disable signal line, the at least one channel disable signal line is activated if the power means determines that the selected direct memory access device is inoperative.

20. The computer system according to claim 19, wherein said power means further generates at least one system management interrupt signal to request a software service routine to power-on the selected direct memory access device if the selected direct memory access device is powered-off.

21. A computer system for managing power usage by a plurality of direct memory access devices each capable of performing a direct memory access, said computer system comprising:

a system bus;

at least one central processing unit coupled to said system bus;

at least one bus controller coupled to said system bus;

at least one memory unit coupled to said system bus;

a direct memory access controller coupled to said system bus and said memory unit, said direct memory access controller generates a first plurality of control signals through a plurality of direct memory access control signal lines, said first plurality of control signals includes at least one direct memory access mask identification signal transmitting a channel number identifying a selected direct memory access device of the plurality of direct memory access devices selected to perform the direct memory access, and an address strobe outputted from said direct memory access controller, said address strobe indicating that direct memory access has been requested between the selected direct memory access device and said at least one memory unit; and a power management device coupled to said system bus and said direct memory access controller, said power management device manages power status of the plurality of direct memory access devices by generating a second plurality of control signals to be inputted into said direct memory access controller, said second plurality of control signals being at least one control signal to temporarily disable the direct memory access, and at least one system management interrupt signal to request a software service routine to power-on the selected direct memory access device if said selected direct memory access device is powered-off.

22. The computer system according to claim 21, wherein the second plurality of control signals further include at least one direct memory access mask identification signal line.

23. A method for managing power usage by at least one device capable of performing direct memory access, said method comprising the steps of:

receiving a signal indicating that a DMA is requested for a selected direct memory access slave device;

receiving a channel number corresponding to the selected direct memory access slave device;

determining whether the selected direct memory access slave device is operational;

asserting a disable signal line corresponding to said channel number of the selected direct memory access device if the selected direct memory access slave device is not operative;

requesting a system management interrupt to invoke a software service routine to re-power the selected direct memory access slave device; and deasserting the disable line upon completion of the software service routine.

24. An apparatus to manage power usage of a direct memory access device, the apparatus comprising:

a direct memory access controller; and a power management device coupled to the direct memory access controller, said power management device signals said direct memory access controller to prevent a direct memory access from being requested of the direct memory access device when the direct memory access device is inoperative.

25. The apparatus according to claim 24, wherein said power management device is coupled to said direct memory access controller through an address strobe line to signal that said direct memory access has been requested.

26. The apparatus according to claim 25, wherein said power management device is also coupled to said direct memory access controller through at least one direct memory access mask identification line to indicate that the device has been selected to perform the direct memory access.

27. The apparatus according to claim 26, wherein said power management device is coupled to said direct memory access controller through at least one channel disable line to disable the direct memory access until the device is operative.

28. The apparatus according to claim 24, wherein said power management device is coupled to said direct memory access controller through at least one channel disable line to disable the direct memory access.

29. A computer system managing power usage of a direct memory access device, the computer system comprising:
- a bus;
- a processor coupled to said bus;
- a memory unit coupled to said bus;
- a direct memory access controller coupled to said bus and said memory unit; and
- a power management device coupled to at least the direct memory access controller said power management device signals said direct memory access controller to prevent a direct memory access from being requested of the direct memory access device when the direct memory access device is inoperative.

30. The computer system according to claim 29, wherein the power management device is coupled to the direct memory access controller via a plurality of signal lines.

31. The computer system according to claim 30, wherein said plurality of signal lines included an address strobe line to transmit an address strobe signal from the direct memory access controller to said power management device to indicate that the direct memory access has been requested between the device and said memory unit.

32. The computer system according to claim 31, wherein said plurality of signal lines further includes at least one direct memory access mask identification line to transmit a mask signal from said direct memory access controller to said power management device to indicate that the device has been selected to perform the direct memory access.

33. The computer system according to claim 31 includes at least one channel disable signal line to cause said direct memory access controller to disable the direct memory access if the device is inoperative.

34. The computer system according to claim 33, where said at least one channel disable signal line is used to temporarily disable the direct memory access until the device is operative.

\* \* \* \* \*